US006662953B1

(12) United States Patent
Rouse

(10) Patent No.: US 6,662,953 B1
(45) Date of Patent: *Dec. 16, 2003

(54) AIR PULSE FEEDER

(76) Inventor: James Allen Rouse, 302 Jonesville Rd., Apt. #H1, Simpsonville, SC (US) 29681

( * ) Notice: Subject to any disclaimer, the term of this patent is extended or adjusted under 35 U.S.C. 154(b) by 23 days.

This patent is subject to a terminal disclaimer.

(21) Appl. No.: 10/302,292

(22) Filed: Nov. 22, 2002

Related U.S. Application Data

(63) Continuation-in-part of application No. 09/846,719, filed on May 1, 2001, now Pat. No. 6,484,902.
(60) Provisional application No. 60/200,920, filed on May 1, 2000.

(51) Int. Cl.[7] .............................................. B07B 13/05
(52) U.S. Cl. ...................... 209/682; 209/911; 406/136; 406/137; 406/144; 221/278
(58) Field of Search ............................ 406/73, 85, 112, 406/115, 128, 130, 132, 136, 137, 144, 122; 221/278; 209/680, 682, 911, 932

(56) References Cited

U.S. PATENT DOCUMENTS

| 1,730,195 A | * | 10/1929 | Davis ........................ 451/99 |
| 2,399,629 A | | 5/1946 | Fisher |
| 3,179,378 A | | 4/1965 | Zehz et al. |
| 3,942,645 A | * | 3/1976 | Aronson ..................... 209/545 |
| 4,118,074 A | | 10/1978 | Solt |
| 4,182,586 A | | 1/1980 | Lenhart |
| 4,216,865 A | * | 8/1980 | Dudley ....................... 209/539 |
| 4,578,001 A | | 3/1986 | Ochs et al. |
| 4,614,283 A | | 9/1986 | Becker |
| 4,688,679 A | * | 8/1987 | Lindgren .................... 209/691 |
| 4,741,428 A | | 5/1988 | Taniguchi et al. |
| 4,848,974 A | | 7/1989 | Wayt |
| 6,116,822 A | | 9/2000 | Teoh et al. |
| 6,250,471 B1 | * | 6/2001 | Ruthven et al. ........... 209/12.1 |

* cited by examiner

Primary Examiner—Joseph A. Dillon

(57) ABSTRACT

A dispensing system that includes an apparatus comprised of a container with a support surface, an opening in the upper portion for receiving items, a passageway in the lower portion for dispensing items, a guide surface to direct items into the passageway, a means for generating pulses of vacuum that draw pulses of air (or other fluid) into the container through the open passageway, and sufficient volume of available air (or other fluid) outside the passageway and outside the container to fill the vacuum generated inside the container. A preferred method of generating the vacuum pulses is injecting pulses of high-pressure fluid in thin sheets into the container through the open passageway with laminar flow against the support or guide surfaces. Items are lifted and separated by the influx of fluid. Upon termination of pulses, the volume inside the container collapses and items, carried by and buffered by exiting fluid, pass through the open passageway often at speeds in excess of those that would be generated by gravity alone.

22 Claims, 14 Drawing Sheets

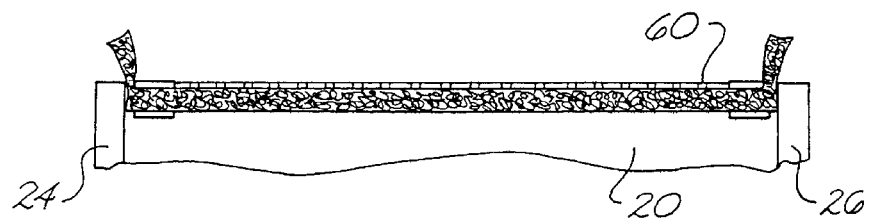
Fig. 9
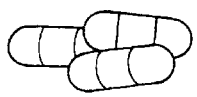  
Fig. 10A   Fig. 10B   Fig. 10C
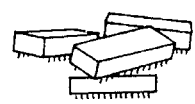 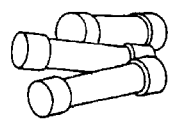 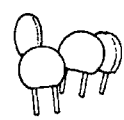
Fig. 10D   Fig. 10E   Fig. 10F

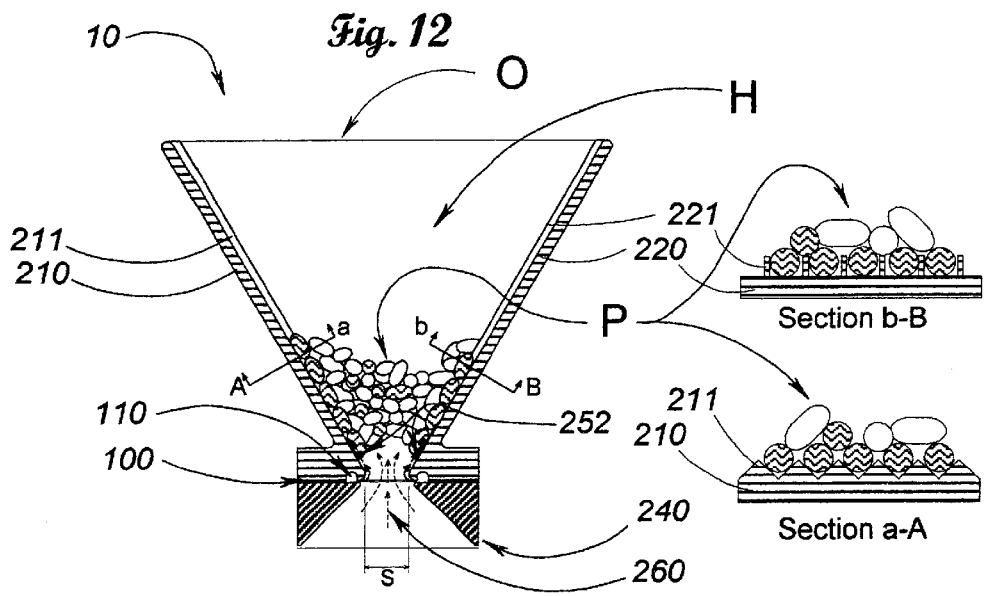
Fig. 12
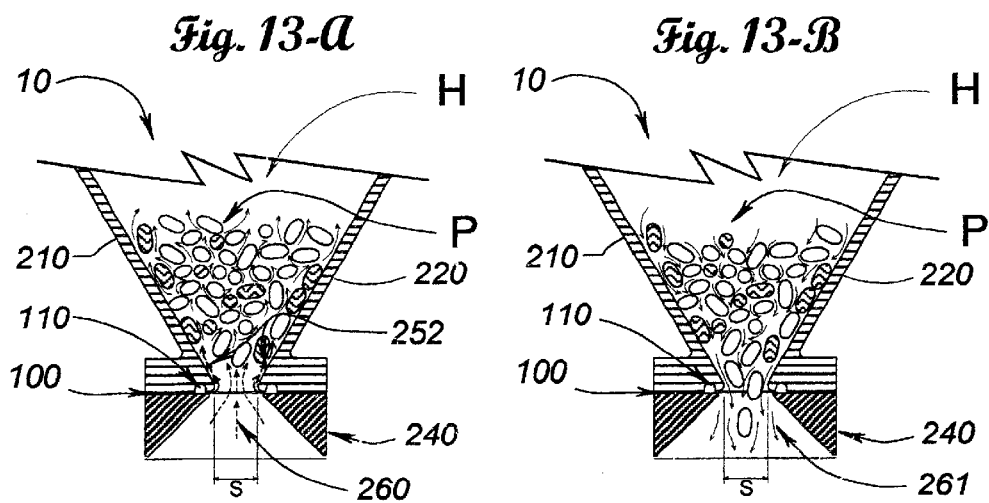
Fig. 13-A    Fig. 13-B

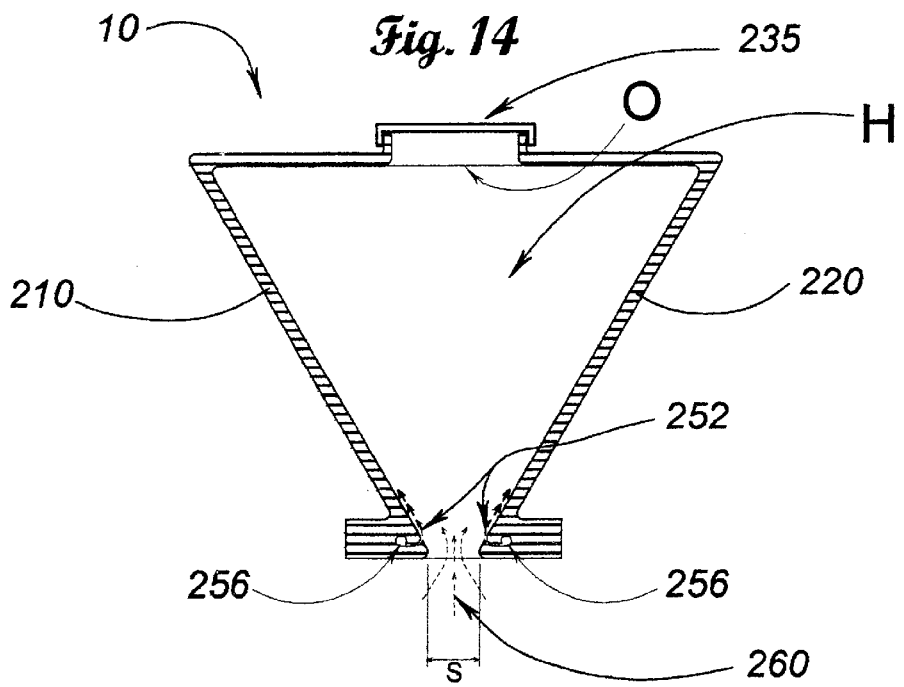
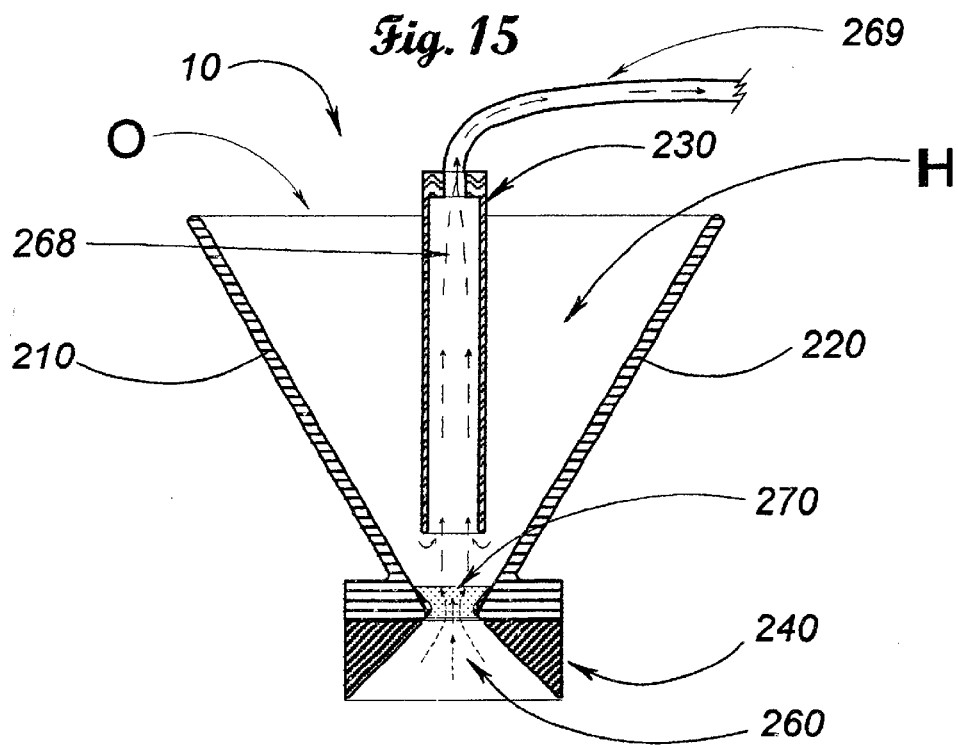

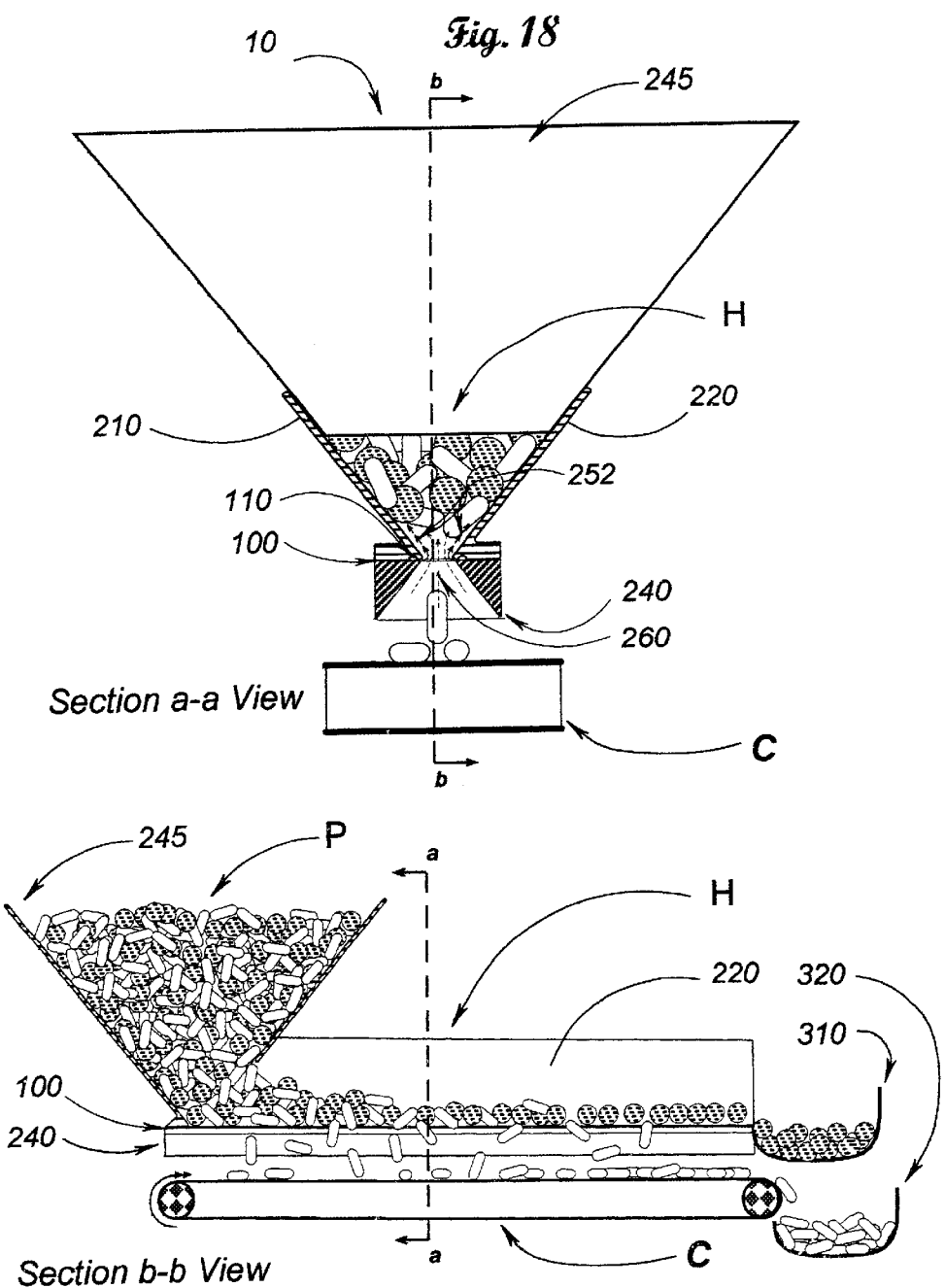

AIR PULSE FEEDER

This is a Continuation in Part of application Ser. No. 09/846,719 filed May 1, 2001 now U.S. Pat. No. 6,484,902. The entire contents of application Ser. No. 09/846,719 is incorporated herein. This application claims the benefit of U.S. Provisional Application Serial No. 60/200,920, filed May 1, 2000.

BACKGROUND OF THE INVENTION

This invention relates to methods and apparatus for material handling, and more particularly, for agitating and/or dispensing materials in a predetermined manner.

In the manufacture of products, it is often necessary to dispense and sort items, such as components used in assemblies or subassemblies, in some ordered manner, such that those items can then be used in subsequent manufacturing processes. These items might be delivered into containers, onto a conveyor belt, or directly to another machine. In other applications, it may be desirable to dispense and sort bulk granular or particulate materials. For the purposes herein, such components or other materials are collectively referred to for simplicity purposes generally as "items," "products," or "product."

In certain applications, it may be necessary to not only deliver items in batches of an approximate predetermined quantity, but also to orient those items as they are dispensed such that those items may be more easily manipulated by machines, such as perhaps robots, or by workers, for subsequent use. It may also be desirable to dispense the items into another feeding device, the first such dispensing device then essentially taking on the role of a pre-feeder. Further, if the items are of a mixed nature, for example having two or more different components in a batch, it may be necessary to differentiate and separate the items into groups of their own kind during the dispensing process.

Other problems may arise in dispensing items, particularly in a production environment. Such items may become entangled with one another, and thus frustrate dispensing of such items in a controlled manner. Also, depending on the product being dispensed, static electricity may build up such that the product clings to the hopper or other container in which the product is held. Moisture can also cause a problem with such product by increasing the likelihood of adhesion of the items in groups.

Further, mechanical agitation or vibration of the items, such as is found in certain conventional dispensing devices, could potentially damage delicate items prior to being dispensed for subsequent use.

A dispenser may also be used for dispensing parts or components for certain manufacturing processing steps, such as de-flashing, cleaning, drying, counting, visual inspection, random selection, testing, chemical treatment, painting, coating, labeling, recycling, crushing, etc.

Various material handling devices have been patented. U.S. Pat. No. 4,118,074, issued to Solt, discloses a pulsed air activated conveyor for transporting bulk material. U.S. Pat. No. 4,848,974, issued to Wayt, discloses a system for the fluidized conveyance of flat articles, such as lids or bottoms for cans. U.S. Pat. No. 4,182,586, issued to Lenhart also discloses an air operated material handler, wherein jets of air are used to separate and align bulk storage items such as containers. U.S. Pat. No. 4,578,001, issued to Ochs et al., discloses an air conveyor hopper having air nozzles positioned on a rotating feed disc for engaging and carrying items.

While the foregoing designs are known, there still exists a need for improved methods and apparatus to perform mixing and dispensing of product.

AIR PULSE FEEDER

SUPPLEMENT TO THE BACKGROUND

Teoh et al. In U.S. Pat. No. 6,116,822 discloses the use of a vertical jet of air into a plurality of parts in order to agitate the parts and break up their bridge over a dispensing aperture. This jet of air, however is not described, illustrated, nor configured to take advantage of Bernoulli's principle by which the rapid motion of air might create a vacuum that could draw into the parts hopper a volume of air greater than that supplied by the jet itself. The closed nature of the connection between hopper and channel leading to the pick up location prohibit the free flow of ambient air necessary to effect such an amplification of air flow.

SUMMARY OF THE INVENTION

It is, therefore, an object of the present invention to provide a dispensing system for dispensing products.

Another object of the present invention is to provide a method of dispensing products.

Another object of the present invention is to provide a method and apparatus for detangling products.

Yet another object of the present invention is to provide a method and apparatus for orienting products.

A still further object of the present invention is to provide a method and apparatus for detangling and orienting products.

A further object of the present invention is to provide a method and apparatus for sorting products.

A still further object of the present invention is to provide a method and apparatus for mixing products.

Generally, the present invention includes a dispensing apparatus for dispensing items from a plurality of items and comprises a container having a support surface for supporting the plurality of items, the container having an upper portion and an opening in the upper portion for receiving the plurality of the items. The container also has an open passageway in a lower portion thereof for dispensing items from the container. At least one pressurized fluid outlet is provided for delivering a pulse of pressurized fluid through the open passageway into the container of sufficient pressure to lift the plurality of items above the support surface, and at least one guide surface is provided for directing at least one of the plurality of items through the open passageway subsequent to the delivery of the pulse of pressurized fluid.

More specifically, the present invention includes an apparatus and methods for dispensing and/or mixing a variety of products on a predetermined or automated basis. The system uses pressurized fluid and a controller such as a programmable logic controller ("PLC"), microprocessor, or the like, to mix and/or dispense product upon application of compressed fluid pulses to the product. Products are "fluidized" by the pulse of compressed fluid provided to the hopper, the compressed fluid preferably being a compressed gas such as air, although other gases or fluids, and in particular, inert gases could be used, depending on the specific application.

The present invention allows for products such as small components, parts, or particles to be dispensed from a batch contained in a compartment or hopper. Such products may be. dispensed to containers, various types of conveyances, or other dispensers, feeders, magazines, cartridges, or another machine for further processing.

The pulse application of compressed air temporarily lifts and levitates the items in the hopper, while simultaneously blanketing them in the flow of air. Upon termination of the pulse, the items again drop, due to force of gravity, into the hopper, but due to the lifting and levitation of the items caused by the pulse, one or more items may be reoriented such that as the pulse flow ceases, such items are properly orientated to pass through a dispensing door or opening, such as a slot, in a lower portion of the hopper. The remaining items in the hopper, by their nature, may again become entangled or otherwise contact one another as they fall into place in the hopper after the pulse flow, such that such items bridge the dispensing slot to thereby prevent the remaining products from passing therethrough.

An analogous example of how the present invention operates is the shaking of the salt shaker in order to release salt on a food item. In certain instances, inverting the salt shaker will allow the flow of granular salt through tiny openings in the salt shaker. However, over time, the salt within the salt shaker may bridge the openings thereby preventing further flow of salt. This requires the salt shaker to again be either shaken, or reverted to its normal position and then reinverted in order to once again begin flow of the salt.

Products dispensed as a result of the pulse flow, or "blast," are generally dispensed in a row which, if a conveyance such as a conveyor belt is used, could be oriented to be transverse to the direction of travel of the conveyor belt, or, in line with the conveyor belt travel to allow for a more continuous line of products to be provided on the conveyor belt.

Control may be maintained over the dispensing rate and distribution of products being dispensed and this allows for an approximate predetermined quantity of products to be dispensed with each pulse of pressurized fluid, in a manner which may be independent of actual pulse frequency.

The pulses can be programmed to be made infrequently, in a series of intermittent predetermined sequences, or continuously with the frequency of hundred, or perhaps a thousand or more, pulses per minute.

Further, the present invention can provide dispensing in synchronism with the movement and speed of other machines in response to signals of one or more sensors which may be provided on the present dispensing system, and, the system can be configured to dispense products and parts of similar shape and size oriented in a predetermined direction.

SUPPLEMENT TO THE SUMMARY OF THE INVENTION

The objectives of this invention include providing a method and apparatus for mixing, untangling, orienting, separating, dispensing, and feeding items from a plurality of items to some receiving apparatus, mechanism, or container.

This application gives additional emphasis and makes additional claims to important aspects of the invention. Specifically, much of the effectiveness of this invention comes from it's power to generate a vacuum that draws into the container, through the open passageway at the bottom of the container, significant volumes of pulsed fluid. The fluid brought in by vacuum is normally the main mover of the plurality of items. This use of pulsed vacuum to draw in pulsed fluid through the dispensing aperture is a distinguishing feature for this invention over the prior art.

The present invention includes an apparatus comprised of a container with a support surface, an opening in the upper portion for receiving items, a passageway in the lower portion for dispensing items, a guide surface to direct items into the passageway, a means for generating pulses of vacuum that draw pulses of air (or other fluid) into the container through the open passageway, and sufficient volume of available air outside the passageway and outside the container to fill the vacuum generated inside the container. The pulses of fluid serve to lift and separate items immediately above and around the passageway.

In many cases the items in the immediate area of the passageway and beyond are fluidized.

There is a natural tendency for items thus lifted and separated to "flow" out the passageway upon termination of the pulse, as the air forced in and expanded by the sudden vacuum is now released to collapse and return to the lower pressure area created outside the container by the abrupt departure of the air from outside the container to the inside. This means that items inside the container might exit faster than if they were dependent upon gravity alone. The retreating air is forcing them along. It also means the items are less likely to immediately re-jam since the natural vacuums created by the moving fluid tend to align the items with the path the air takes upon it's retreat out the passageway. There is also a tendency for items thus buffered with air to be better protected from damage than if vibration or other direct contact with some more rigid impetus moved them.

This application describes a variety of means to generate pulses of vacuum that in turn draw pulses of air (or other fluid) into the container through the passageway. These include the use of pulses of pressurized air into the container through the passageway, near the open passageway and in a second container, which extends into the lower portion of the primary container as well as other approaches. The use of thin sheets of pressurized air as provided by air knives and the use of laminar flow of air against supporting surfaces and guide surfaces further enhance the effectiveness of these pulses. When using vacuum pulses farther removed from the passageway it becomes important, during those pulses; to close the top opening in the container designed for supplying items. Otherwise, the power of the vacuum to draw air in through the passageway at the bottom of the container could be greatly diminished.

The invention teaches varying the size of the passageway. This can be especially helpful when dealing with more than a single configuration of items over time.

The invention teaches the inclusion of another container within the main container. Such a container can be used to block the area directly above the passageway from a large portion of the items in the main container. This can reduce the pressure on the items immediately above the passageway. This in turn reduces the necessary volume of air and level of pressure required to achieve satisfactory lift and separation of items to be dispensed at any given time. Such a container may also be configured to supply pulses of vacuum in the immediate area of the passageway.

The invention teaches the associated use of means to orient items to be dispensed and the associated use of means to separate various configurations of items.

The invention teaches the use of air funnels to enhance the effect of pulses of vacuum for moving the maximum volume of air into the container through the passageway.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which:

FIG. 9 is a sectional view taken along lines 9—9 of FIG. 3;

FIGS. 10A–10F illustrate capsules, beans, tablets, electronic chips, fuses, and capacitors, respectively, all of which may be dispensed using the dispensing system of the present invention;

SUPPLEMENT TO THE BRIEF DESCRIPTION OF THE DRAWINGS

The foregoing, as well as other objects of the present invention, will be further apparent from the following description of the drawings and preferred embodiments of the invention, when taken together with the accompanying specifications and the drawings including all the information from the original application included herein, in which:

FIG. 12 is a cross section of a preferred embodiment of said invention illustrating a source for pulsed fluid outside the container that generates pulses of vacuum thereby drawing into the container ambient fluid from outside the container. The figure illustrates one configuration of an air funnel below the container to enhance the efficiency of the vacuum. It also shows sections of a guide surface and support surface configured to help align parts.

FIGS. 13-A and 13-B illustrate parts being lifted and separated during pulses of vacuum and parts flowing down and out the dispensing aperture between pulses.

FIG. 14 is a cross section of a preferred embodiment of said invention illustrating a sealed top to the container with a removable lid. This cross section also illustrates pressurized fluids entering the container from within the lower portion of the container as a means for generating pulses of vacuum.

FIG. 15 is a cross section of a preferred embodiment of said invention illustrating an interchangeable part used to vary the size and shape of the open passageway by blocking part of the opening. This figure also illustrates delivery of pulses of vacuum through a second container within the main container (hopper) thereby drawing into the container ambient fluid from outside the container through the lower opening. In this case the vacuum source is not shown.

Figure 16:
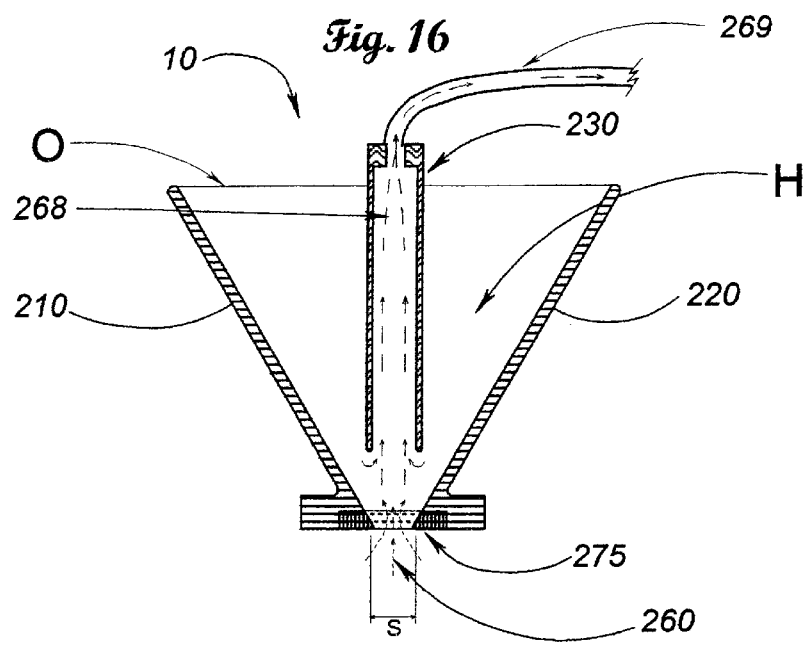

FIG. 16 is a cross section of a preferred embodiment of said invention illustrating the use of an interchangeable part to replace the open passageway itself in another size.

Figure 17:
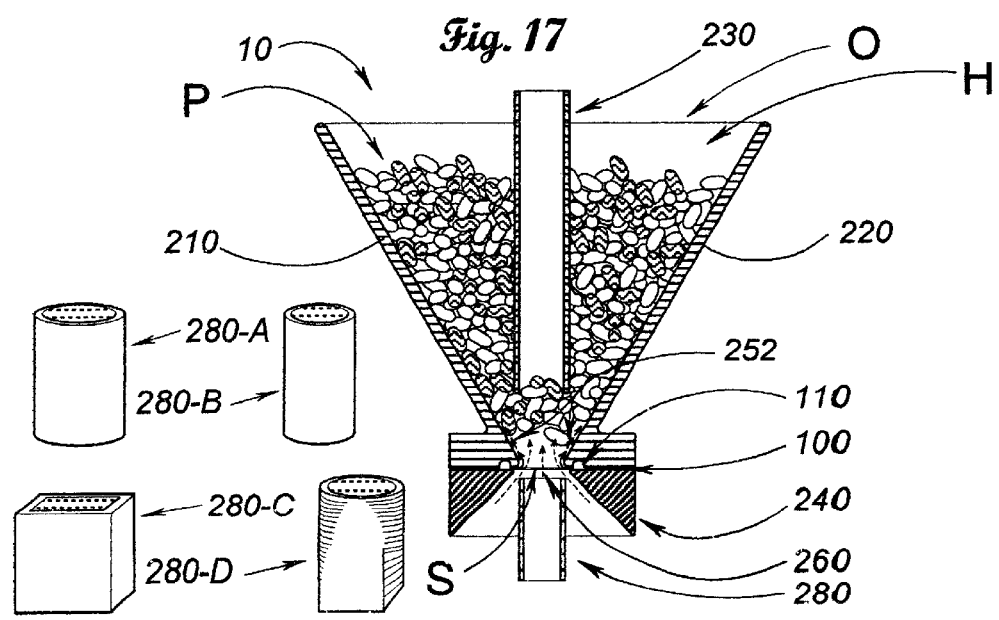

FIG. 17. is a cross section of a preferred embodiment of said invention with interchangeable exit apparatus. Several examples of exit apparatus are shown.

FIG. 18. shows two sections of a preferred embodiment of the invention illustrating one way to use the invention as a separator.

DESCRIPTION OF THE PREFERRED EMBODIMENT

The accompanying drawings and the description which follows set forth this invention in its preferred embodiment. However, it is contemplated that persons generally familiar with material handling systems and methods will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the mixing and dispensing system of the present invention is indicated generally in the figures by reference character 10, such system 10 being suitable for practicing of the methods of the present invention.

Figure 3:
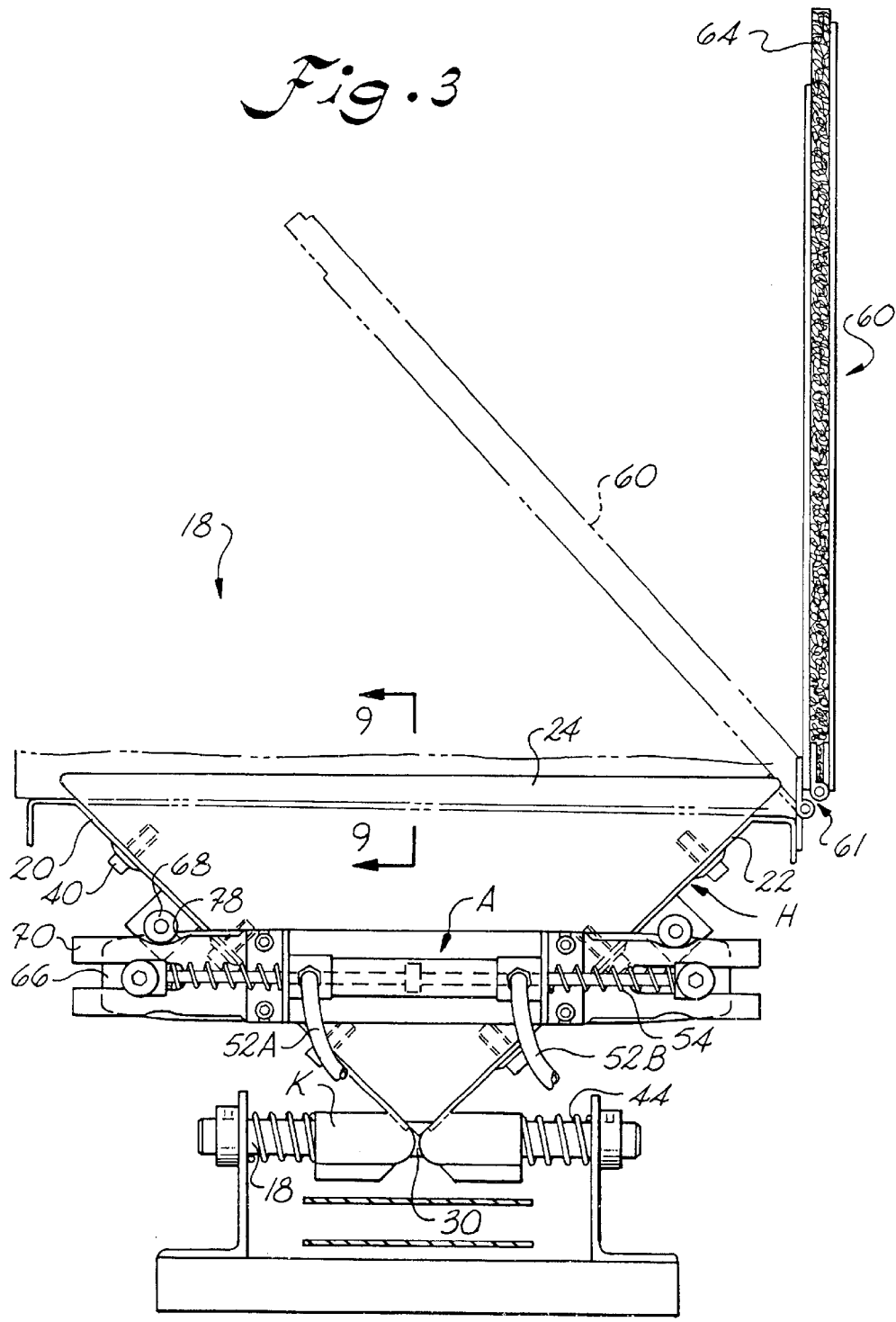
FIG. 3 is a side elevational view of a dispensing system constructed in accordance with the present invention, wherein the dispensing slot is in a closed configuration.
Figure 4:
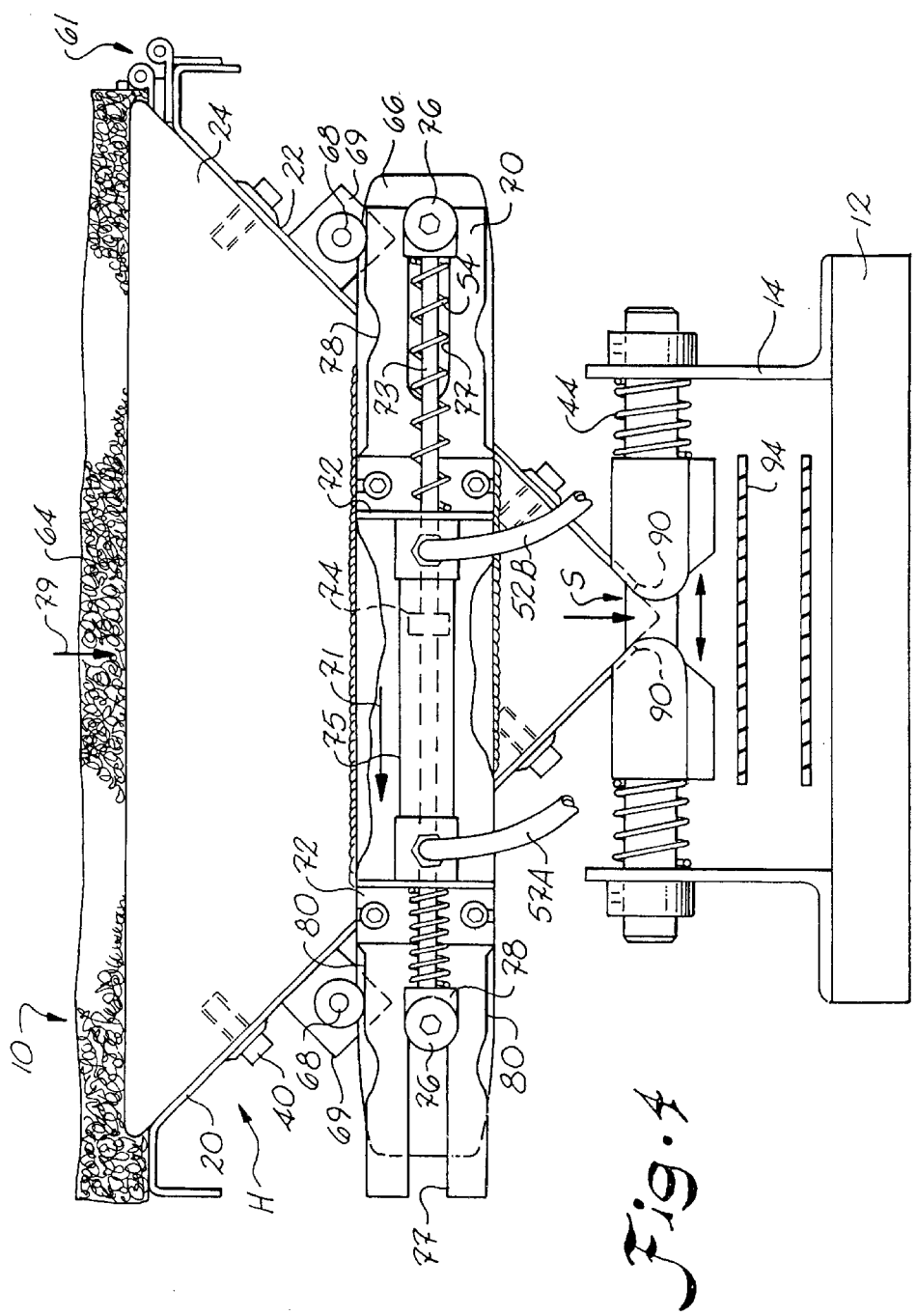
FIG. 4 is a side elevational view of the dispensing system shown in FIG. 3, with the dispensing slot in an open position.

As generally shown in FIGS. 1 and 11A–11C, the dispensing system includes a generally V-shaped hopper, generally H, mounted on a base structure, generally 12. Brackets 14 are attached to the base and carry journal rods 18 which are received in bores 19 of air knives, generally K Air knives K are carried for sliding movement on rods 18, in a manner to be discussed in more detail below. Fixedly connected to the air knives K are end walls 20, 22 of hopper H. Hopper H has four walls, end walls 20, 22 forming two of those walls, and side walls 24, 26 forming the remaining two walls. End walls 20, 22 flare outwardly from one another, and the lower portions of the end walls 20, 22 meet at the apex 30 of the hopper H, when the hopper H is in a "closed" position, as shown in FIG. 3. When the hopper H is in a "dispensing" position, as shown in FIG. 4, the. end walls 20, 22 are separated from one another to form a dispensing slot, generally S, for dispensing products, generally P, from the compartment, or interior portion, generally 34, of the hopper H.

Both end walls 20, 22 may be moveable laterally with respect to one another, or only one end wall may be moveable, with the other end wall being fixed. The side walls 24, 26, which are generally triangularly-shaped, are configured for generally vertical movement with respect to the end walls 20, 22, end walls 20, 22 having elongated slots 38 for receipt of bolts 40 of side walls 24, 26.

Movement of the side walls 24, 26 is accomplished by fluid actuators, generally A, such as pneumatic actuators, operating from a compressed air supply (not shown). It is to be understood, however, that other types of actuators could be used, such as solenoids, motors, spring mechanisms, etc., if desired, to open a dispensing slot in the lower portion of hopper H. Actuation of the actuators A is accomplished using conventional valving techniques and also includes the use of a programmable logic controller (PLC) (not shown) or other controller, such a microprocessor. Compression springs 44 are provided on rods 18 in order to force air knives K, end walls 20, 22 to a normally closed position, wherein the dispensing slot S is closed. Activation of the actuators A forces side walls 24, 26 upwardly or downwardly (as discussed in more detail below), which in turn forces one or more end walls 20, 22 and corresponding air knives K inwardly or outwardly, respectively, as such are connected to end walls 20, 22. Upon deactivation of the supply of pressurized air to actuators A, compression springs 44 force air knives K back towards one another, and compression springs 54 likewise, force actuators A to their centered, "home," position to force side walls 24, 26 upwardly to thereby close dispensing slot S.

Pressurized air is provided to actuators A via hoses 52A, 52B, and pressurized air is also intermittently provided to inlets 53 of air knives K through hoses 50 for pulsing purposes.

As shown in FIG. 9, a hinged cover 60 is provided for selectively covering the opening 62 of hopper H, such cover including filter material, generally 64, carried with grate 66, for allowing air to pass upwardly therethrough, while also preventing product from being expelled upwardly from hopper H during the pulses of compressed air and also for preventing contaminants from entering hopper H and contaminating the products contained therein. Preferably, filter material overlaps the upper portion of side walls 24, 26 somewhat to accommodate the upward and downward movements of the side walls.

Figure 2:
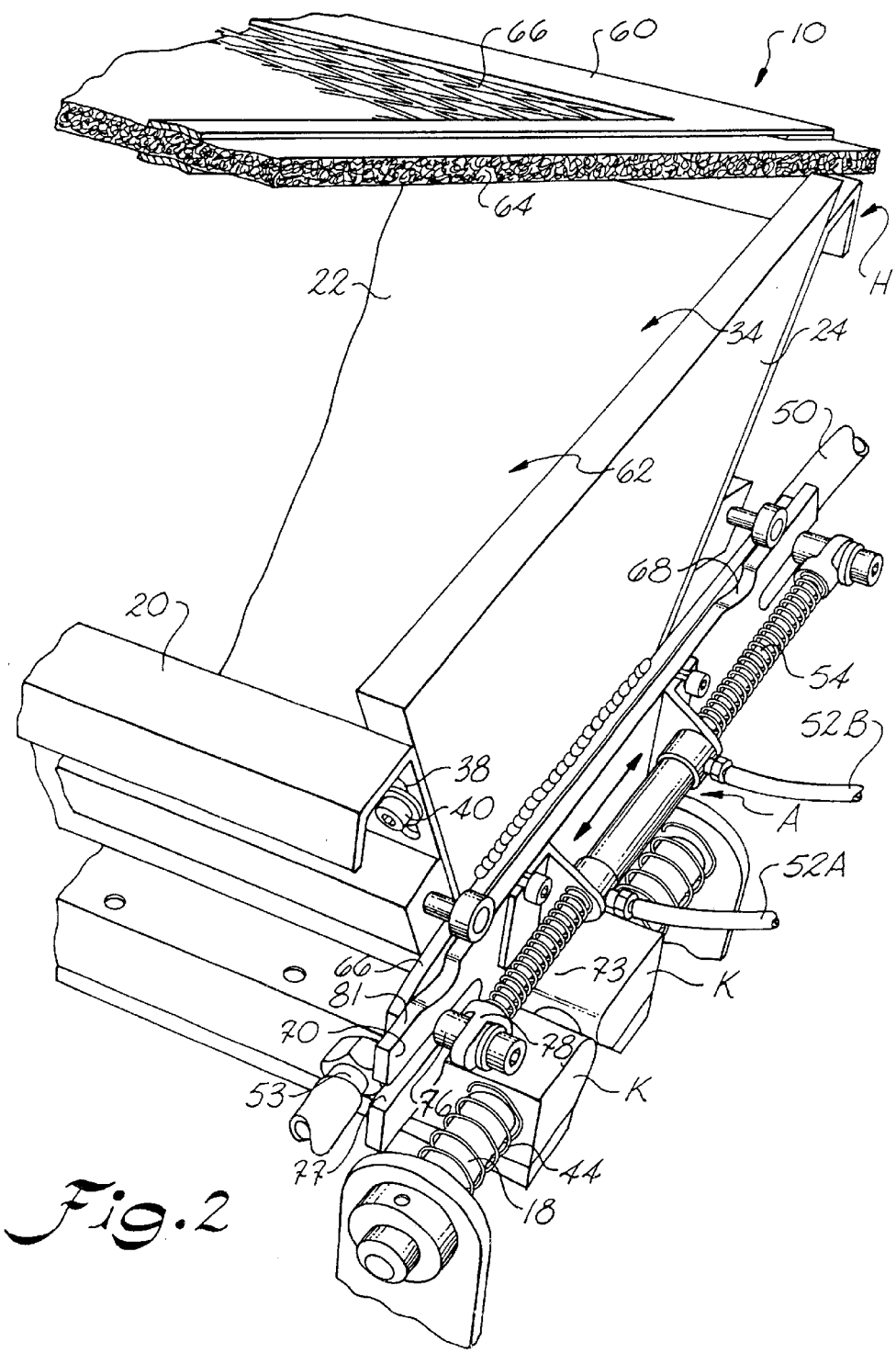
FIG. 2 is a partial perspective view of a dispensing system constructed in accordance with the present invention.

FIG. 2 illustrates cover 60 in an open position exposing interior portion 34 of hopper H. Cover 60 is connected to hopper H via hinge, generally 61, as shown in FIGS. 3, 4, and 10.

The opening and closing of dispensing slot S is performed using a unique system. An elongated bar 66 is attached to each side wall 24, 26, such as by welding. Thus, bar 66 moves upwardly and downwardly with side walls 24, 26.

Cam followers 68 are carried in cam follower supports 69, which are fixedly attached to each end wall 20, 22. Cam followers 68 are allowed to freely rotate with respect to cam supports 69 and ride upon a camming surface 81 of bar 70 which is carried for sliding movement with respect to the bar 66. In other words, camming bar 70 may shift from side to side, as shown by arrow 71 in FIG. 4.

Fixedly attached to camming bar 70 are brackets 72 to which actuator A is attached. Actuator A is preferably a double action cylinder having a rod 73 extending therethrough with a central piston number 74. The cylinder portion 75 of actuator A is fixedly attached to brackets 72, and the ends of rod 73 are each fixedly attached to bar 66 through use of shoulder bolts 76, which act as guides within slots 77 provided on each end of camming bar 70. Compression springs 54 normally urge cylinder portion 75 of actuator A to a central position, substantially equal distantly spaced between rod ends 78, when actuator A is not pressurized.

Upon pressurization of actuator A, the cylinder portion 75 of actuator A may move to one side or the other, since the ends 78 of rod 73 are fixed to bar 66. This shifting from side to side of cylinder 75 causes a corresponding shifting of cam bar 70. Detents 78 are provided on cam bar 70 and are used to open and close dispensing slot S through interaction of cam follower 68 therewith. For example, as shown in FIG. 3, cam followers 68 are resting within detents 78. In this configuration, the dispensing slot S is closed. However, as shown in FIG. 4, cam bar 70 has been shifted to the left, through introduction of pressurized air through hose 52B, which forces cam follower 68 upwardly out of detents 78. This causes a corresponding downward movement of side plates 24, 26, as shown by arrow 79, against the force of compression springs 44, which consequently forces the ends 90 of end walls 20, 22 and air knives K apart. This opens dispensing slot S to allow product P to be dispensed therefrom. It is to be noted that ordinarily, the force of compression springs 54 act through end walls 20, 22 to force side walls 24, 26 upwardly, and that the downward movement of side walls 24, 26 in opening dispensing slot is performed against the force of springs 54.

As shown in FIG. 4 introduction of air into air hose 52B would cause the leftward movement of cam bar 70, as shown by arrow 71, to open dispensing slot S. However, if air is bled from hose 52B, springs 54 would effectively force cylinder 75 to the centermost position, such that cam followers 68 again are received in detents 78. This would in turn, force side walls 24, 26 upwardly, and the compression action of springs 44 would force air knives K, and end walls 20, 22 together, to thereby close dispensing slot S. Alternately, compressed air could be introduced to hose 52A to shift cylinder 75 to the right to open dispensing slot S.

Note that the width of the dispensing slot can be changed by changing the location of the detents 78 in camming bar 70. Camming bar 70 may include an additional camming surface 80 opposite camming surface 81, with detents 82 having different relative positions with respect to detents 78. This allows the same camming bar 70 to be used, by flipping it over, to yield a different width for dispensing slot S.

Figure 6:
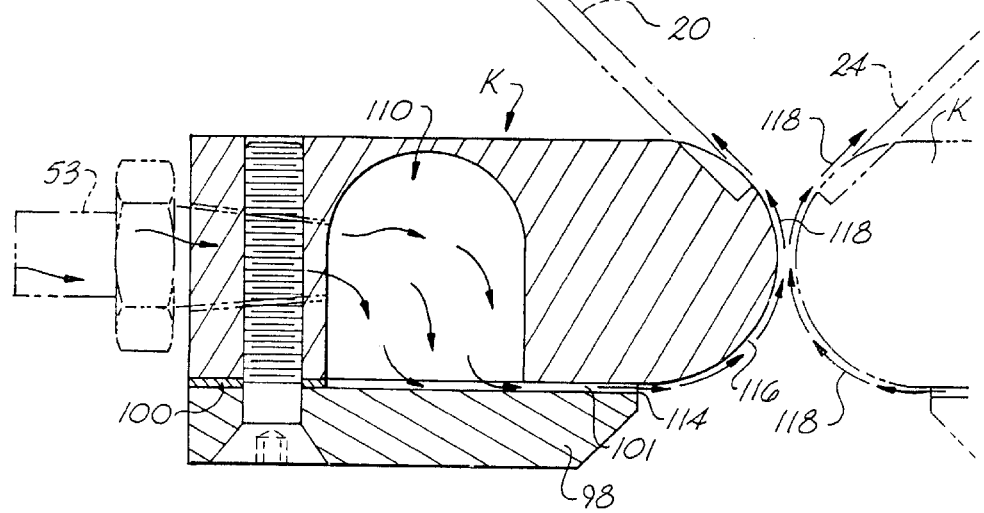
FIG. 6 is a sectional view taken along lines 6—6 of FIG. 5.
Figure 8:
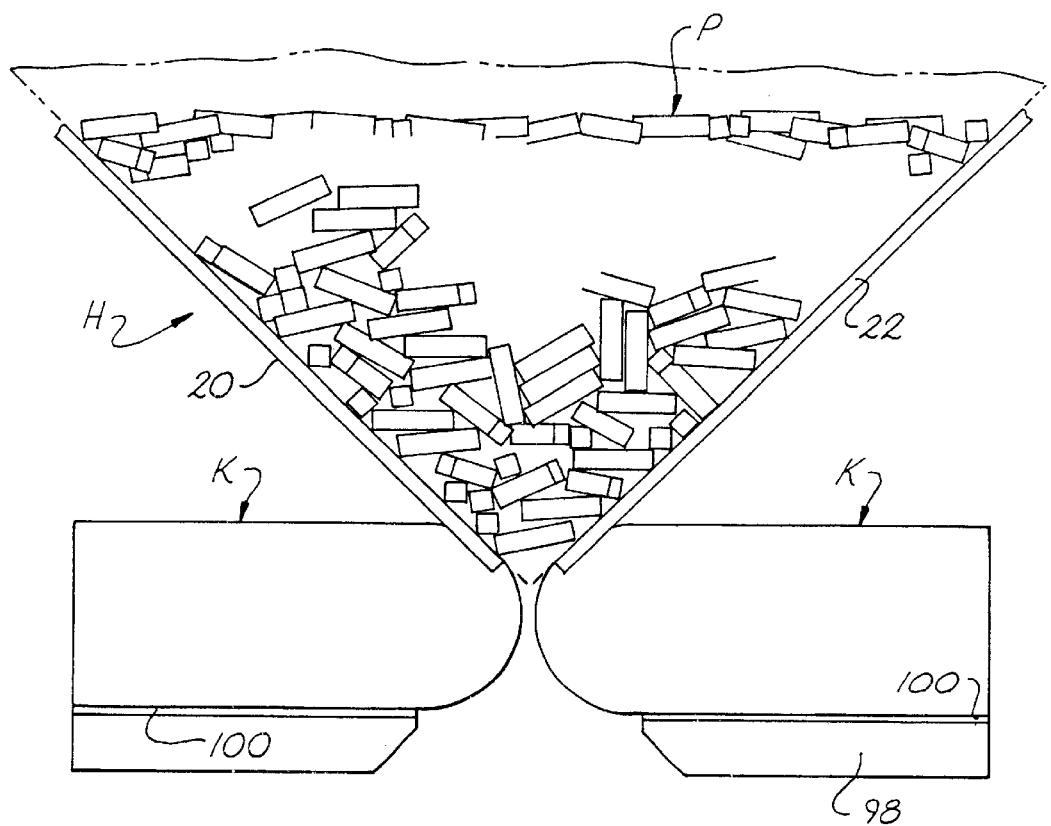
FIG. 8 is a schematic view of a dispensing system constructed in accordance with the present invention, wherein products to be dispensed are shown being held in a hopper.

FIGS. 4, 6, and 8 also illustrate dispensing passageway, or opening, S in an open configuration. Note that end walls 20, 22 has been moved apart by the downward movement of side walls 24, 26, which in essence "pry" end walls 20, 22 apart in order to create dispensing slot S. Note that side wall 24 has moved downwardly such that the lower tip thereof extends beyond the bottom edge 90 of end walls 20, 22.

Figure 1:
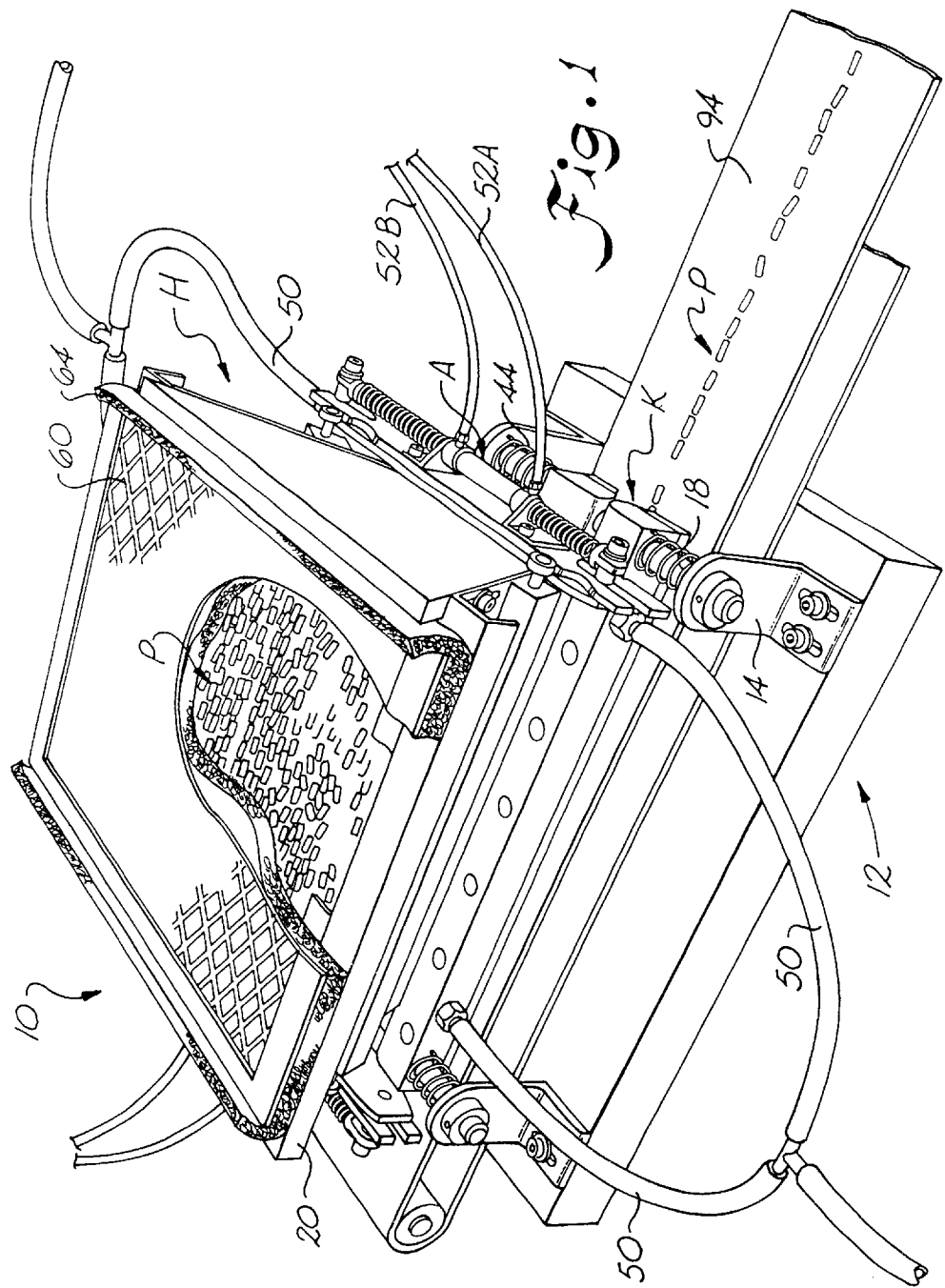
FIG. 1 is a perspective view of the dispensing system constructed in accordance with the present invention.

FIG. 1 shows product P, which could be capsules, electronic chips, etc. which have been deposited on the conveyor belt 94. Note in this example that the elongated dispensing slot S extends parallel to the direction of travel of the conveyor belt 94. Therefore, the product P is deposited in a generally continuous line on the conveyor belt 94. In other applications, however, the conveyor belt could run transverse to the dispensing slot such that the product is deposited in spaced apart, transversely extending rows across the width of the conveyor belt.

Figure 5:
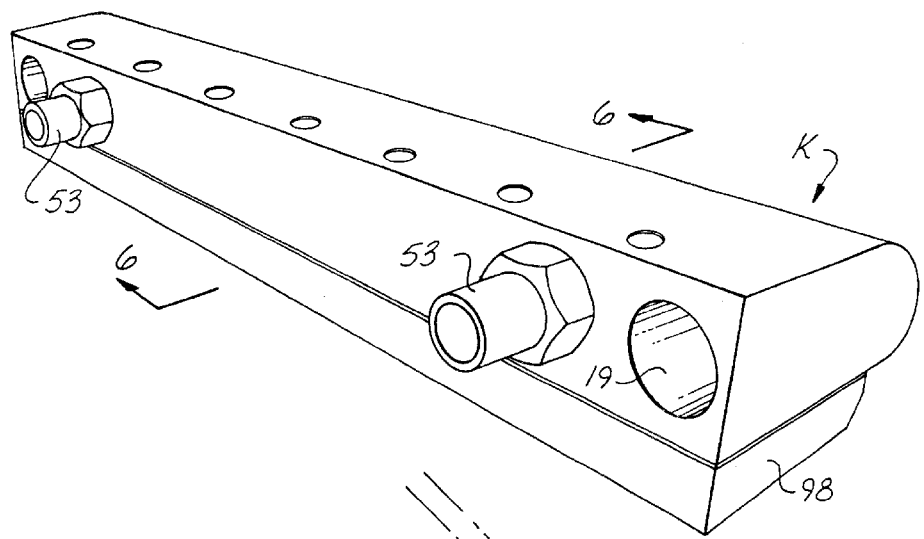
FIG. 5 is a perspective view of an air knife constructed in accordance with the present invention.
Figure 7:
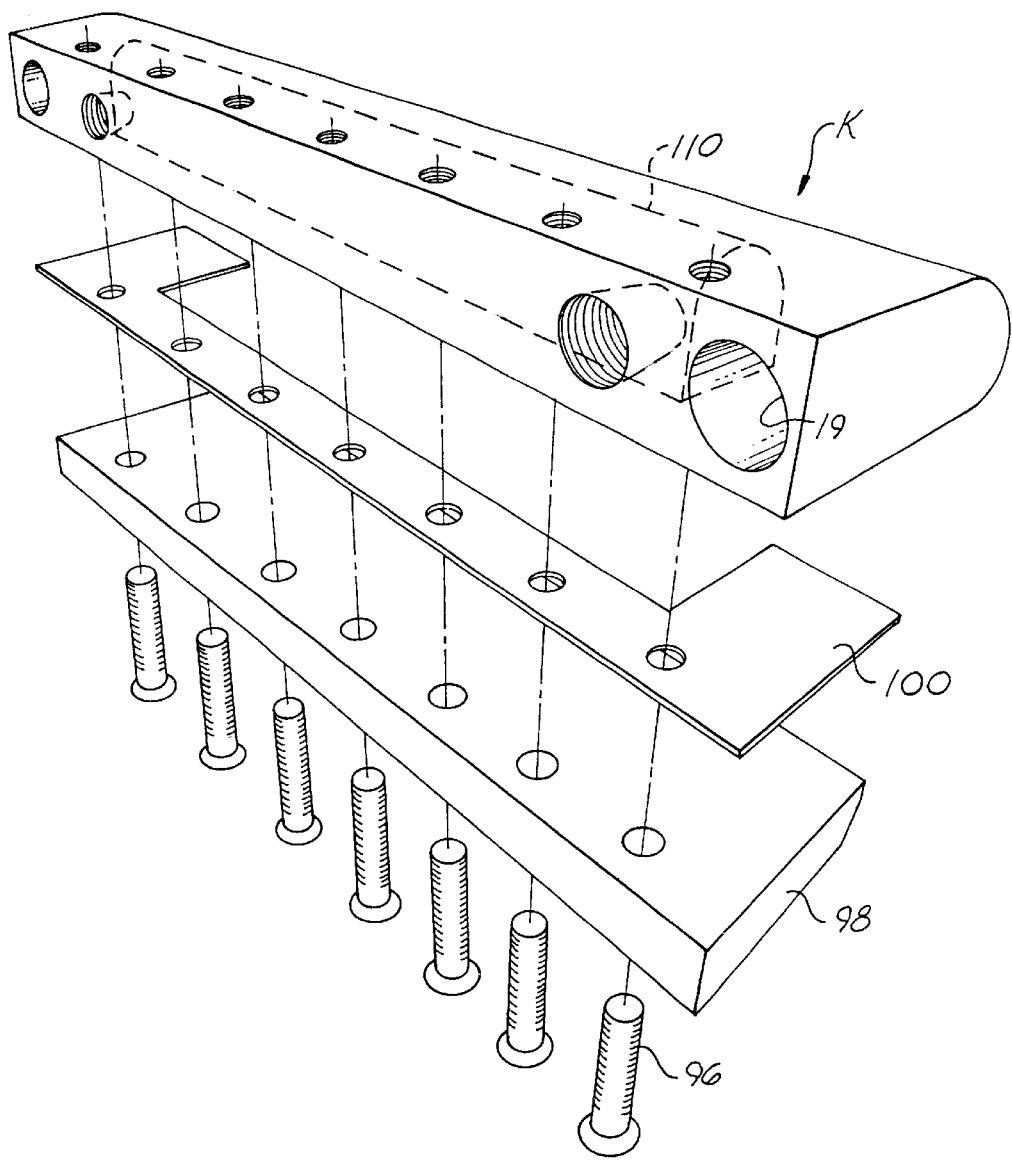
FIG. 7 is an exploded view of an air knife constructed in accordance with the present invention.

FIGS. 5–7 illustrate air knives K in detail. The assembly is held together with screws 96 and includes an air knife plate 98, and a shim, or orifice plate, generally 100, having a cut-out portion which defines the gap 101 through which air flows from the air knife K.

FIG. 8 illustrates product P such as electronic chips, capsules, etc. held in the hopper H when the dispensing slot S is open. This could be a configuration of the product P between pulses of pressurized air or other fluid. Note how the individual items, in conjunction with other items, serve to bridge the dispensing opening S to prevent other items from falling through the opening S. Upon a blast of pressurized air through the air knives K, however, such items would be lifted and levitated and agitated such that when such subsequent blast ends, the product will again fall downwardly, and this time the items which are properly oriented fit through the slot opening (which is of predetermined width and length), will fall through the opening.

FIGS. 10A through 10F illustrate a brief sampling of typical items which could be dispensed using dispensing system 10. Such items include capsules, as shown in FIG. 10A, beans as shown in FIG. 10B, tablets, shown in FIG. 10C, electronic chips, shown in FIG. 10D, fuses, shown in FIG. 10E, and capacitors, shown in FIG. 10F. By virtue of the blasts of air provided by the present invention, items which could be prone to entanglement, such as the electronic chips (FIG. 10D) and capacitors (FIG. 10F) could become separated and untangled from one another. With respect to mixing of items, the present invention could differentiate capsules shown in FIG. 10A and tablets shown in FIG. 10C, if both were carried with the hopper, by simply varying the opening of the dispensing slot such that it would only dispense items the thickness of the tablets. Thus, assuming the capsules were a different thickness, the capsules would remain in the hopper, while the tablets would continue to be dispensed upon application of the blasts of compressed air, thereby effectively sorting the capsules and the tablets.

Figure 11A:
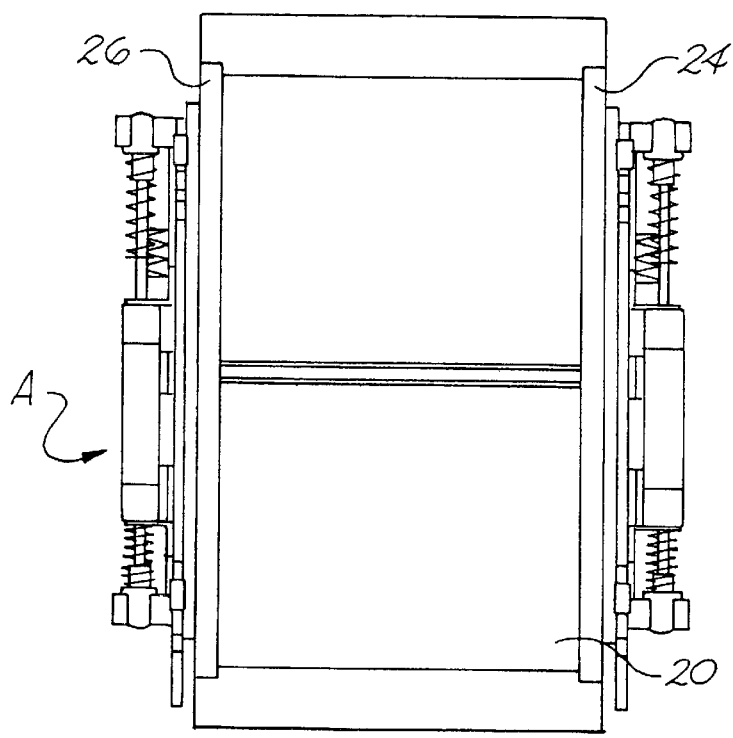
FIG. 11A is a simplified plan view of a dispensing system constructed in accordance with the present invention.
Figure 11B:
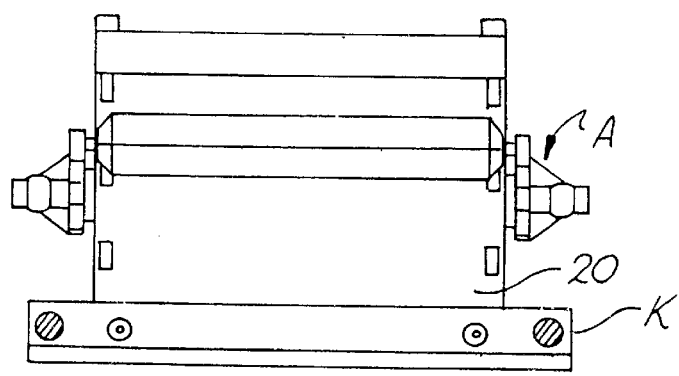
FIG. 11B is a simplified front elevational view of the dispensing system shown in FIG. 11A.
Figure 11C:
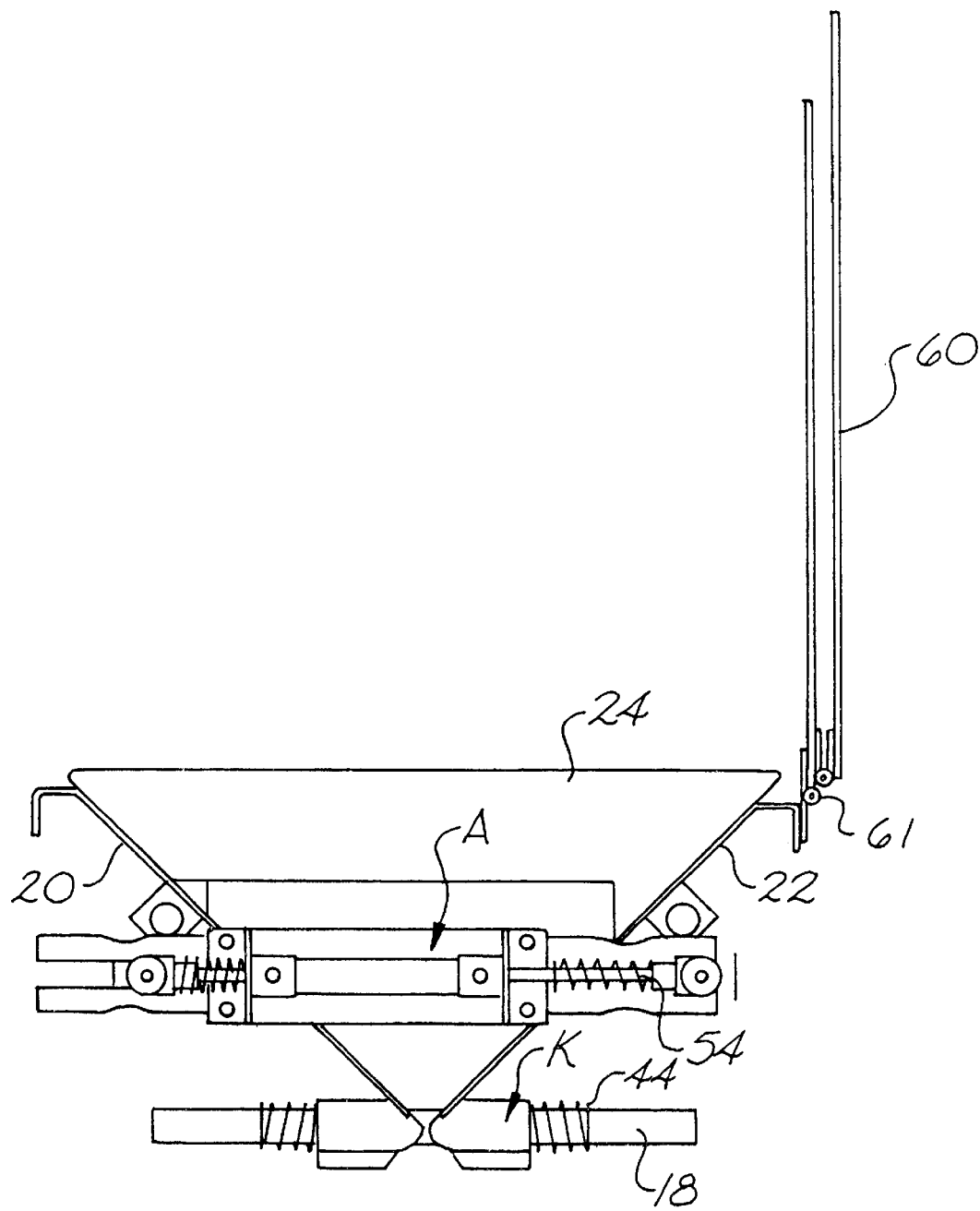
FIG. 11C is a simplified right side elevational view of the dispensing system illustrated in FIG. 11A.

FIG. 11A illustrates hopper H, and also dispensing slot S in an open configuration. FIG. 11B illustrates the positioning of air knives K beneath hopper H, and FIG. 11C illustrates the hopper H with the dispensing slot S in an open position.

In operation, product, such as small parts, components, or other items are placed within the compartment 34 of hopper H. An ordinary. switch (not shown) is activated such that the PLC energizes a conventional solenoid valve (not shown) causing it to open and deliver compressed air from a compressed air source (not shown) to the hoses 52A, 52B connected to actuators A. Although not shown, such compressed air could be conditioned by passing the air through a dehumidifier or humidifier (if necessary), air filter, and pressure regulator prior to entering actuators A Movement of the cylinder 74 on rod 68 extending from the actuators A causes a change in the variable geometry of the hopper H, by moving one or more end walls 20, 22 outwardly with respect to the other. The selective movement of the actuators A also causes side walls 24, 26 to move downwardly to force a separation between side walls 20, 20 and the air knives K to separate and form dispensing slot S, which is of a venturi shape, at the bottom of the hopper H.

As the dispensing slot S becomes open, the PLC activates a conventional quick response valve (not shown) causing it to open for a predetermined number of milliseconds. Compressed air passes through the valve and then enters chamber 110 located in and extending the substantial length of each air knife K. The compressed air then accelerates through elongated thin orifice 101, on the order of 0.002–0.006 inches, preferably, and through an outlet 114 provided in each air knife K. The resulting pressurized air flow exhibits laminar flow characteristics such that the air flow exhausted from the outlet generally stays attached to the curved forward surfaces 116 of the air knives K, as shown by arrows 118, due to the Coanda effect, which thus causes the air flow to change direction as it flows upwardly. The air flow continues upwardly into the hopper H and tends to follow the surfaces of the outwardly-flared end walls 20, 22 before eventually becoming turbulent.

As the accelerated and expanding air emitted from the air knives K blasts into the hopper H, entangled and bridged items lodged in and blocking the dispensing opening S are disbursed by the force of the blast. The air flow quickly becomes turbulent and is completely diffused, while passing through the interstitial spaces between the items in the hopper. The initial burst of air causes the items in the hopper to become essentially fluidized, and, accordingly, the air generally coats the items with a thin layer of protective air.

The effect of the blast of air, which begins as a laminar flow and then becomes turbulent, causes a separation and mixing of the contents of the hopper. Should items come into contact with each other, this contact would potentially be of reduced force, due to the blanket of air surrounding such items.

When the pulse of air ends, the upward momentum of the parts is overcome by gravity, and the ambient barometric pressure fills the partial vacuum created by the sudden expansion of the product caused by the pulses of air. This is believed to essentially defluidize the items as they fall down to the open dispensing slot S, and it is also believed that the descent of the product is accelerated by the sudden contraction of air into the area of relative vacuum created by the expansion of the items.

The items nearest to the bottom of the hopper H arrive first at the dispensing slot S. Since such items are now spread apart and relatively fluidized, they tend to align themselves with the narrow opening of the dispensing slot, thereby forming a row. Flowing on a thin layer of protective air, the items flow out generally unimpeded through the dispensing slot S between the air knives, and on to some form of conveyance, or into a bin, further dispensing device, machine, etc. in a suitable condition to facilitate proper orientation for subsequent use.

The items that remain in the hopper H tend to congregate and entangle in the base of the hopper thereby forming bridges across the dispensing opening S and becoming lodged there. The "pile" or other conglomeration of the product is thus generally reestablished, as such of the pulse items are no longer fluidized, since the air movement of the pulse has ended. Further, the weight of the upper portion of the pile compresses the bottom layer of items bridging the dispensing opening, thereby holding such bridging items in place and blocking the opening. This condition remains until another pulse of air occurs.

Beginning with the activation of the quick response valve, this same scenario takes place again, with the exception of the dispensing opening S, which remains open until the desired number of items are dispensed, or the hopper is empty. At this point, the PLC deactivates the solenoid valve controlling air flow to the actuators A, and air is bled off from the pneumatic actuators using conventional bleed-off valves or other relief fittings (not shown). This allows compression springs 54 located on the rods 73 to cause actuators A to return to their home position. This causes side walls 24, 26 to move upwardly, and allows the air knives K and end walls 20, 22 to be forced together by compression springs 44. The movement of the end walls 20, 22 and the air knives K together reestablishes the hopper H back to its original shape and geometry,. with the dispensing opening S closed.

The present invention is particularly suited for processing components or parts with traits that cause problems for conventional feeders, since the present invention uses different methods and applies additional principles of physics and aerodynamics. Conventional feeders may force components to move in a way which is harmful to the component, whereas the present invention, by suspending product in air, tends to reduce the possibility of product damage.

The present invention does not force items through a restriction while they are in a pile and entangled with one another. Instead, the items are lifted, separated, fluidized, mixed, and untangled and then allowed to align themselves naturally with a relatively narrow and controlled dispensing opening.

The dispensing system of the present invention can also be used with mixed batches in order to separate desired products from other products which may have been inadvertently left in the hopper. Also, components which may be prone to sticking together due to static electricity or because of moisture are more easily managed due to the blasts of air which continually move, separate and agitate the products.

In determining the appropriate width of the dispensing opening, such width is preferably narrower than the longer dimension of the items which must pass therethrough. This allows for better control over the items, by aligning their narrowest dimension with that of the dispensing opening each time they are pulsed with air.

Preferably, the hopper is of modular design with the end walls and/or side walls being readily exchangeable to permit providing a hopper of a different height, and/or width, if necessary. The outward incline of end walls 20, 22, which can be varied depending on the particular application, provides guide surfaces for product towards dispensing slot S. This would necessitate a corresponding change of the triangular shaped side walls 24, 26 to accommodate the changed incline of end walls 20, 22. Further, the dispensing system should find applicability as a retrofit to existing machines requiring dispensing of product because of its versatile and readily variable modular design. A preferred range for the angle between end walls 20, 22 is between 60 and 90 degrees.

The present invention may be used for dispensing and/or mixing a wide variety of materials and components. In certain applications, component sizes may range from approximately 1/64th of an inch to 5/8th of an inch across their shortest dimension, with 1/32nd of an inch to 1/2 inch being typical. However, it is to be understood that these dimensions are for illustrative purposes, and the present invention could be sized to accommodate materials with smaller or larger dimensions, depending on the particular application.

In certain applications mixing or agitation of product may be desired, even if dispensing of the product is not needed at that time. In such an event, dispensing slot S could simply remain only partially open, to prevent dispensing of the product, while pulsing the product with compressed air or other fluid.

For extremely small product P, such as granular material, fine powder, etc., a limitation may be reached based on the correlation of density, shape, texture, and the resulting aerodynamic drag of such material. For example, particles which are too small and light, such as fine powder, may float in the air when subjected to the pulsed fluid blasts of the present invention. Another limitation as to size involves parts or components which may be too large and too heavy, as a practical matter, because such parts would require a relatively large amount of compressed fluid to be used to lift and agitate such parts during the dispensing operation. Also, the use of such large amounts of pressurized fluid or compressed air could also present noise problems. It is to be understood, however, that the present invention could be used for such large products in situations where the dispensing abilities of the present invention outweigh such concerns.

The maximum applicability of the present invention would typically lie with components which range between small, dense items and relatively large volume items which are of less density. Further, components having surface configurations which are readily engageable by a fluid flow would be better suited for the present invention than would be spherical items, such as ball bearings. However, if small ball bearings, approximating the size of BBs, could be dispensed if such ball bearings were mixed with non-spherical items, such as oblong shaped parts.

The present invention finds particular use in dispensing and/or mixing items that are subject to damage or abrasion which may result from rubbing or impact forces of conventional dispensing devices. The present dispensing system is also desirable for components which may, from time to time, become mixed with other types of components. Further, the present invention finds use with components which need to be fed rapidly in large numbers or fed continuously at a constant and specific rate, or fed periodically, or in a series of intermittent patterns, or in unison with other process. Further, the present dispensing system can be used for components which are to be dispensed spaced apart from one another, for example, along a moveable conveyor belt, or for components which need to be dispensed aligned in a continuous row or file, or alternately, aligned in a series or rows or ranks. Components which are wet or which carry lubricating oils, or which tend to stick to each other when combined together, may be dispensed by the present dispensing system, as could also components which are required to be maintained or lubricated while in contact with one another in a batch configuration. Moreover, the present invention is suitable for components that are subject to static electric clinging, and finally, for general purpose components having no special or unique needs or requirements.

EXAMPLES

It is anticipated that the present invention may be used to dispense and/or mix a variety of materials, products and components, including but not limited to, the items listed below:

A. Electrical parts, such as fuses, capacitors, resistors, connectors, chips, microprocessors, etc.

B. Medicines or vitamins, such as pills, tablets, capsules, gel caps, etc.

C. Small mechanical parts, such as screws, washers, rivets, bolts, gears, bushings, nuts, pins, etc.

D. Diced foods, or foods shaped as small objects, such as candies, beans, cereals, macaroni, pasta, etc.

E. Pelletized or granular foods, such as those fed to farm animals, zoo animals, pets, etc.

F. Pelletized or granular chemicals, such as fertilizers, cleaning supplies, explosives, etc.

G. Agricultural products, such as rice, wheat, grains, oats, seeds, berries, nuts, etc.

H. Plastic parts, such as media, buttons, fittings, caps, spacers, toy parts, etc.

I. Rubber parts, such as O-rings, grommets, seals, gaskets, erasers, etc.

From the foregoing, it can be seen that the present invention provides a versatile system for dispensing and/or mixing a variety of materials and items through its ability to cause a strong aerodynamic effect upon such items. Through adjustment of the geometries of the hopper, the pulse frequency and duration, the dispensing opening, fluid pressure, flow rates, directions of the pressurized fluid flow, and timing and sequencing of the fluid flow blasts, the dispensing and mixing characteristics of the present invention can be varied, as desired. Moreover, by virtue of the design of the present invention, a precise and exacting adjustment may not be necessary in order to nevertheless maintain adequate control of the dispensing of products.

To accommodate products of particular dimensions, the geometric shape, dimensional ratios, etc. of end walls 20, 22 and side walls 24, 26 of the hopper can be varied to obtain the desired width for accommodating such products. Further, the width of the dispensing outlet can readily be varied depending on component size, as can the pulse frequency, duration, and pressure of the fluid used to lift and agitate products in the hopper. More specifically, pressurized fluid volumetric flow rates could be varied simply by varying the diameter of the compressed air supply lines 50, and the blast or "spray" pattern of the pressurized fluid to which the products are subjected can be readily varied by changing the width of the air knives outlets 114 or simply the orifice plate 100. Also, although not shown, sensors could be provided to detect various parameters of dispensing system 10, and such sensors connected to a PLC for controlling operation of system 10 in response to the output of such sensors.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

SUPPLEMENT TO THE DESCRIPTION OF PREFERRED EMBODIMENTS

Referring now to the drawings in detail, wherein like reference characters represent like elements or features throughout the various views, the mixing and dispensing system of the present invention is indicated generally by "10".

Referring now to FIG. 12; pulses of pressurized fluid 252, are emitted from the chamber 110 through a narrow opening whose size is determined by the spacer 100. Due to the Coanda effect, the fluid tends to remain close to the surface as that surface turns upward into the container H. The container H serves as a hopper to hold parts P for processing. In this figure one surface 210 is indicated as a guide surface. The other surface 220 is indicated as a support surface. In this particular configuration, however, both surfaces serve as both support and guide surfaces. "V" shaped, parallel groves 211 in guide surface 210 help to align parts P as they move downward against the guide surface. Parallel fins 221 are perpendicular to support surface 220. The fins 221 help to align parts P as they move downward against the support surface. Sections a-A and b-B of surfaces 210 and 220 respectively, show these surface configurations from another view. As is consistent with Bernoulli's principle, the pulses of pressurized fluid create a vacuum which in turn draws into the container H pulses of ambient fluids 260 from outside the hopper up through the opening S in the lower portion of the container. The drawing power of the pressurized fluid is enhanced by air funnel 240. The opening 0 in the top of the container allows for the addition of parts P into the hopper for processing. The opening S in the lower portion of the container also serves as dispensing aperture for parts as is illustrated in other figures.

Referring now to FIGS. 13-A; the illustration shows the lower portion of a preferred embodiment of the present invention. Pulses of pressurized fluid 252 are emitted from the chamber 110 through a narrow opening whose size is determined by the spacer 100. Due to the Coanda effect, the fluid tends to remain close to the surface as that surface turns upward into the container. The container serves as a hopper to hold parts P for processing. In this figure one surface 210 is indicated as a guide surface. The other surface 220 is indicated as a support surface. In this particular configuration, however, both surfaces serve as both support and guide surfaces. As is consistent with Bernoulli's principle, these pulses of pressurized fluid create a vacuum which in turn draws into the container H pulses of ambient fluids 260 from outside the hopper up through the opening S in the lower portion of the container. The drawing power of the pressurized fluid is enhanced by air funnel 240. The upward pulse of fluid lifts and separates parts P as indicated in FIG. 13-A by the space between parts and the arrows flowing upward between parts.

FIG. 13-B shows the same parts P as the pulse ends, the fluid "collapses" and begins to retreat through open passageway S. The parts not only fall, but also are also swept along by and buffered by the retreating fluid 261. The parts tend to align themselves with the flow of fluid and so pass through the open passageway faster, with less product damage, and in larger quantities than would be normal for parts that were simply dropped or shaken to give them impetus to pass through the open passageway S. This downward flow of fluid and parts is indicated by the generally lower position of parts P and the downward arrows 261 between and around the parts. This downward flow may be ended by the equalization of pressure within and without the container, by bridging of the parts over the open passageway S, and/or by the next upward pulse of fluid through open passageway S.

Referring now to FIG. 14; pulses of pressurized fluid 252 are emitted from the chamber 256 through a narrow opening inside the lower portion of hopper H. Due to the Coanda effect, the fluid tends to remain close to the surface as that surface turns upward within hopper H. In this figure one surface 210 is indicated as a guide surface. The other surface 220 is indicated as a support surface. In this particular configuration, however, both surfaces serve as both support and guide surfaces. As is consistent with Bernoulli's principle, these pulses of pressurized fluid create a vacuum which in turn draws into the hopper pulses of ambient fluids 260 through opening S from outside the hopper. The opening O in the top of the container allows for the addition of parts, shown in other figures, into the hopper for processing. The removable lid 235 for the opening O allows for the opening O to be closed or opened as desired. The opening S in the lower portion of the container also serves as dispensing aperture for parts as is illustrated in other figures. The parts are lifted and separated by these vacuum pulses and subsequently flow out the dispensing aperture S between pulses the same as illustrated in other figures.

FIG. 15. presents a preferred embodiment of invention 10 and illustrates the use of an interchangeable (drop in) part 270 used to block part of the established open passageway S. By changing the size and/or shape of the open passageway in this simple manner, it may be unnecessary to have additional whole dispenser machines when changing items or when it is desired to separate items of a smaller size from standard items. In many instances the changes in opening size and shape that are possible with such a simple device as this can also serve to orient items as they exit the container. This figure also illustrates a second container 230 within the hopper. When the main container H is loaded with parts P as illustrated in other figures, the second container 230 blocks the area directly above the passageway from a large portion of the parts. This reduces the pressure on the items immediately above the passageway. This in turn reduces the necessary volume of air and level of pressure required to achieve satisfactory lift and separation of items to be dispensed at any given time. The second container 230 supplies vacuum pulses near the lower aperture. The second container 230 is sealed to a conduit 269 in its upper portion.

Pulses of vacuum 268 are supplied from another source at the opposite end (not shown) of the conduit. This in turn draws pulses of fluid 260 from outside the container through the opening S as reduced in size by the interchangeable part 270. The air funnel 240 enhances the efficiency of this influx of fluid 260. The opening S in the lower portion of the container also serves as dispensing aperture for parts as is illustrated in other figures. The parts are lifted and separated by these vacuum pulses and subsequently flow out the dispensing aperture S between pulses the same as illustrated in other figures.

FIG. 16. illustrates a preferred embodiment 10 of this invention. In this case no air funnel 240 is shown, though it might well be added to enhance the influx of fluid. An interchangeable device 275 is shown as a replacement for that section of the container defining the opening S. In this case the interchangeable element 275 provides a smaller opening. Other such interchangeable elements might provide larger openings, subdivide the opening into multiple openings or change the shape of the opening. This is similar in function to the "drop in", interchangeable element 270 shown in FIG. 15. As described, however, 270 adds material to the existing apparatus and would therefore never increase the size of the opening. The design of such interchangeable elements will directly affect the flow of fluids and the flow of parts in the overall apparatus 10. A second container 230 is shown within the hopper H. When the main container H is loaded with parts P as illustrated in other figures, the second container 230 blocks the area directly above the passageway from a large portion of the parts. This reduces the pressure on the items immediately above the passageway. This in turn reduces the necessary volume of air and level of pressure required to achieve satisfactory lift and separation of items to be dispensed at any given time. The second container 230 supplies vacuum pulses near the lower aperture. The second container 230 is sealed to a conduit 269 in its upper portion. Pulses of vacuum 268 are supplied from another source at the opposite end (not shown) of the conduit. This in turn draws pulses of fluid 260 from outside the container through the opening S as modified by the interchangeable part 275. These pulses will then effect movement and flow of parts from hopper H as described and illustrated in other Figures.

FIG. 17 illustrates a preferred embodiment 10 of this invention incorporating an interchangeable exit apparatus 280. Such an exit apparatus may be located within the open passageway S or below the open passageway as illustrated here. Example variations of this exit apparatus 280-A, 280-B, 280-C and 280-D are also illustrated. These interchangeable parts of various configurations can serve multiple functions. Some configurations of exit apparatus may simply vary by size, as is the case between 280-A and 280-B. This shift in size may serve to accommodate the dispensing of different sized items when they are processed through the apparatus at different times. This shift may also be used to separate items of different sizes when they are processed in the apparatus at the same time. In another case 28b-A might be used with rectangular solids as well as more rounded items when a range of item orientations are acceptable. But, 280-C might be preferred with rectangular solids when a more restricted orientation of parts is required. 280-D shows an alternative in which the upper opening of the exit apparatus is round and could accept round or rectangular solids of appropriate size. In this case, however, the profile of the exit apparatus changes as it progresses downward. This allows the exit container to further orient a generally rectangular solid as it passes through and out of the exit apparatus. Many variations of size and shape are possible and will be useful depending upon the parts themselves and subsequent operations involving those parts. This figure also shows a second container 230 within the main container H. When the main container H is loaded with parts P as illustrated in other figures, the second container 230 blocks the area directly above the passageway from a large portion of the parts. This reduces the pressure on the items immediately above the passageway. This in turn reduces the necessary volume of air and level of pressure required to achieve satisfactory lift and separation of items to be dispensed at any given time.

FIG. 18. shows two views (section a—a and section b—b) of a preferred embodiment 10 of the invention used as a separator. A pre-feeder 245 supplies the hopper H with two configurations of a plurality of items P at one end of the trough shaped container H. Pulses of pressurized fluid 252 are emitted from a pressurized chamber 110, which extends the length of hopper H through a gap that is also the length of hopper H. Spacer 100 determines the width of the gap. The open passageway S is sized to allow only the smaller of the items (the white ones) to pass through while the larger items (the shaded ones) remain in the hopper. The hopper has a slight decline leading away from the prefeeder toward two receptacles 310 and 320 at the opposite end of the hopper. As the items P are repeatedly lifted, separated and then flow downward toward the open passageway S the smaller items pass through the open passageway onto a conveyor C while the larger items are moved farther and farther down the hopper and eventually into receptacle 310. The conveyor C carries the smaller articles to receptacle 320. The angle of decline, the length of the trough, the volume of items being pre-feed to the hopper and variations in the pulses of pressurized fluid all affect the effectiveness of separating out the smaller parts before the larger parts are delivered into receiving apparatus 310.

These figures illustrate many features of preferred embodiments independently of one another in some cases and in limited combinations in other cases. Such figures are intended to illustrate various features, but are not intended to limit the combinations of various features with one other. In fact, it is anticipated that variations in combinations of features will be normal in order to meet the needs of various manufacturing operations. In similar fashion, there are many unillustrated features that will be obvious to those of ordinary skill in the art based on the descriptions and claims made here. They include, but are not limited to, (1) vacuum pumps and other sources of vacuum pulses, (2) inlets for vacuum pulses into the container at places other than the lower portion of the container, (3) combination of the various features of this invention with other systems such as physical vibrations, sonic vibrations, magnetic, pneumatic and hydraulic pressure, etc.

Preferred embodiments of the invention have been described using specific terms. Such description is for present illustrative purposes only. It is to be understood that changes and variations to such embodiments may be practiced by those of ordinary skill in the art without departing from the spirit or scope of the following claims. Such variations may include, but are not limited to, the substitution of equivalent features or parts and the reversal of various features thereof.

What is claimed is:

1. A dispensing apparatus for which dispenses items from a plurality of items, the dispensing apparatus comprising:
   A. at least one container having:
      1) at least one support surface for supporting said plurality of items;
      2) an upper portion with at least one opening for receiving said plurality of items; and
      3) a lower portion with at least one open passageway for dispensing items from said plurality of items;
      4) at least one guide surface for directing items of said plurality of items into said at least one open passageway;
   B. means for generation of pulses of vacuum that draw pulses of fluid into said at least one container through said at least one open passageway causing an item to be dispensed through said passageway; and
   C. sufficient volume of available fluid outside said at least one open passageway and outside said at least one container to fill the vacuum generated inside the container.

2. The dispensing apparatus as defined in claim 1; wherein said means for generation of pulses of vacuum includes at least one means selected from the group consisting of:
   A. at least one pressurized fluid outlet that delivers pulses of pressurized fluid through said at least one open passageway into said at least one container with sufficient volume and velocity to create a vacuum that draws ambient fluid into said at least one container through said at least one open passageway;
   B. at least one pressurized fluid outlet that delivers pulses of pressurized fluid through said at least one open passageway into said at least one container with laminar flow along at least one inner surface of said at least one container with sufficient volume and velocity to create a vacuum that draws ambient fluid into said at least one container through said at least one open passageway;
   C. at least one pressurized fluid outlet that delivers pulses of pressurized fluid through said at least one open passageway into said at least one container as a thin sheet of fluid with sufficient volume and velocity to create a vacuum that draws ambient fluid into said at least one container through said at least one open passageway;
   D. at least one pressurized fluid outlet within the lower portion of said container that delivers pulses of pressurized fluid that travel in a generally upward direction with sufficient volume and velocity to create a vacuum that draws ambient fluid into said at least one container through said at least one open passageway;
   E. at least one pressurized fluid outlet within the lower portion of said container that delivers pulses of pressurized fluid that travel in a generally upward direction with laminar flow along at least one inner surface of said at least one container with sufficient volume and velocity to create a vacuum that draws ambient fluid into said at least one container through said at least one open passageway;
   F. at least one pressurized fluid outlet within the lower portion of said container that delivers pulses of pressurized fluid as thin sheets of fluid that travel in a generally upward direction with sufficient volume and velocity to create a vacuum that draws ambient fluid into said at least one container through said at least one open passageway;
   G. at least one second container that has a lower portion that is within said at least one container, has at least one opening in said lower portion that allows fluid communication with fluid inside said at least one container; and there is means to generate pulses of vacuum in said at least one second container of sufficient volume and force to draw pulses of fluid into said at least one container through said at least one open passageway.

3. The dispensing apparatus as defined in claim 1, further comprising means to close and reopen said and at least one opening in said upper portion for receiving the plurality of items.

4. The dispensing apparatus as defined in claim 1; wherein said at least one container has at least one surface that flares up and outward from said at least one open passageway.

5. The dispensing apparatus as defined in claim 1, further comprising means for selectively varying the size and shape of said at least one open passageway.

6. The dispensing apparatus as defined in claim 5; wherein said means includes at least one means selected from the group consisting of:
   A. interchangeable elements with different aperture configurations that can be installed as replacements for the material immediately around said at least one open passageway;
   B. interchangeable elements of different configurations that can be installed at or near said at least one open passageway so as to block different portions of said open passageway;
   C. At least one section of material that defines said at least one open passageway is moveable.

7. The dispensing apparatus as defined in claim 1, further comprising at least one second container; said at least one second container:
   A. having a lower portion that is contained within the lower portion of said at least one container;
   B. having an opening in its lower portion that
      1) is generally centered over said open passageway;
      2) is at least as large as said open passageway;
      3) has opposite edges farther apart than the largest dimension of any single item to be dispensed;
   C. having most of its lower portion positioned above said at least one open passageway a distance greater than the largest dimension of any single item to be dispensed; and
   D. having most of its lower portion positioned away from said support surface and away from said guide surface a distance greater than the largest dimension of any single item to be dispensed.

8. The apparatus as defined in claim 1, further comprising means to orient said plurality of items.

9. The apparatus as defined in claim 8; wherein said means includes means selected from the group consisting of:
   A. said at least one support surface that has been custom formed for the orientation of a particular set of items;
   B. said at least one guide surface that has been custom formed for the orientation of a particular set of items;
   C. at least one exit apparatus located within or below said at least one open passageway; said at least one exit apparatus including at least one aperture in it's upper portion formed to accept only items having a predetermined range of orientations;
   D. at least one exit apparatus located within or below said at least one open passageway; said at least one exit apparatus including at least one aperture in it's upper portion formed to accept only items having a predetermined orientation;

E. at least one exit apparatus located within or below said at least one open passageway; said at least one exit apparatus including at least one chamber that is formed to orient items as they pass into, through, or out of said at least one chamber.

10. The apparatus as defined in claim 1, further comprising means to separate one configuration or range of configurations of items from other configurations of items of said plurality of items.

11. The apparatus as defined in claim 10, wherein said means includes means selected from the group consisting of:
   A. said at least one passageway is formed to accept only items having a predetermined range of configurations;
   B. at least one exit apparatus is located within or below said at least one open passageway; said at least one exit apparatus including at least one aperture in it's upper portion formed to accept only items having a predetermined range of configurations.

12. The dispensing apparatus as defined in claim 1, further comprising at least one air funnel; said at least one air funnel:
   A. being located below said at least one container;
   B. having an aperture in its upper portion; said aperture being:
      1) located adjacent to said at least one open passageway;
      2) approximately the size of said at least one open passageway;
   C. having at least one surface that flares outward and downward from said at least one aperture; and
   D. having an opening in said lower portion that is greater than said at least one aperture.

13. A method for dispensing items from a plurality of items; said method comprising:
   A. providing at least one container; said at least one container having:
      1) at least one support surface for supporting said plurality of items;
      2) an upper portion with at least one opening for receiving said plurality of items;
      3) a lower portion with at least one open passageway for dispensing items from said plurality of items;
      4) at least one guide surface for directing items of said plurality of items into said at least one open passageway;
   B. providing items on said support surface of said container;
   C. providing sufficient volume of available fluid outside said at least one open passageway and outside said at least one container to fill the vacuum generated inside the container;
   D. generating pulses of vacuum that draw pulses of fluid into said at least one container through said open passageway; and
   E. allowing at least one item of said plurality of items to pass into said at least one open passageway subsequent to said at least one pulse of vacuum.

14. The method as defined in claim 13, wherein means for generation of said pulses of vacuum includes at least one means selected from the group consisting of:
   A. at least one pressurized fluid outlet that delivers pulses of pressurized fluid through said at least one open passageway into said at least one container with sufficient volume and velocity to create a vacuum that draws ambient fluid into said at least one container through said at least one open passageway;
   B. at least one pressurized fluid outlet that delivers pulses of pressurized fluid through said at least one open passageway into said at least one container with laminar flow along said at least one support surface of said at least one container with sufficient volume and velocity to create a vacuum that draws ambient fluid into said at least one container through said at least one open passageway;
   C. at least one pressurized fluid outlet that delivers pulses of pressurized fluid through said at least one open passageway into said at least one container as a thin sheet of fluid with sufficient volume and velocity to create a vacuum that draws ambient fluid into said at least one container through said at least one open passageway;
   D. at least one pressurized fluid outlet within the lower portion of said container that delivers pulses of pressurized fluid that travel in a generally upward direction with sufficient volume and velocity to create a vacuum that draws ambient fluid into said at least one container through said at least one open passageway;
   E. at least one pressurized fluid outlet within the lower portion of said container that delivers pulses of pressurized fluid that travel in a generally upward direction with laminar flow along at least one inner surface of said at least one container with sufficient volume and velocity to create a vacuum that draws ambient fluid into said at least one container through said at least one open passageway;
   F. at least one pressurized fluid outlet within the lower portion of said container that delivers pulses of pressurized fluid as thin sheets of fluid that travel in a generally upward direction with sufficient volume and velocity to create a vacuum that draws ambient fluid into said at least one container through said at least one open passageway;
   G. at least one second container that has a lower portion that is within said at least one container, has at least one opening in said lower portion that allows fluid communication with fluid inside said at least one container; and there is means to generate pulses of vacuum in said at least one second container of sufficient volume and force to draw pulses of ambient fluid into said at least one container through said at least one open passageway.

15. The method as defined in claim 13, further comprising providing means to close and reopen said and at least one opening in said upper portion for receiving said plurality of items.

16. The method as defined in claim 13; wherein said at least one container has at least one surface that flares up and outward from said at least one open passageway.

17. The method as defined in claim 13, further comprising providing means for selectively varying the size of said at least one open passageway.

18. The method as defined in claim 13, further comprising at least one second container; said at least one second container:
   A. having a lower portion that is contained within the lower portion of said at least one container; and
   B. having an opening in the bottom that
      1) is generally centered over said open passageway; and 2) is at least as large as said open passageway; and
3) has opposite edges farther apart than the largest dimension of any single item to be dispensed;
C. being positioned above said at least one open passageway a distance greater than the largest dimension of any single item to be dispensed; and
D. being positioned away from said support surface and away from said guide surface a distance greater than the largest dimension of any single item to be dispensed.

19. The method as defined in claim 13, further comprising providing means to orient said plurality of items.

20. The method as defined in claim 13, further comprising means to separate one configuration or range of configurations of items from other configurations of items of said plurality of items.

21. The method as defined in claim 13, further comprising providing at least one air funnel; said at least one air funnel:
A. being located below said at least one container;
B. having an aperture in its upper portion; said aperture being:
  1) located adjacent to said at least one open passageway;
  2) approximately the size of said at least one open passageway;
C. having at least one surface that flares outward and downward from said at least one aperture; and
D. having an opening in said lower portion that is greater than said at least one aperture.

22. A method for orienting disoriented items, the items each having first, second, and third item dimensions, each of the first, second, and third item dimensions being perpendicular with respect to one another, and wherein the first item dimension is less than or equal to the second item dimension, and the second item dimension is less than the third item dimension, the method comprising:

providing a container having a support surface, said container having an open passageway in a lower portion thereof for dispensing items from the container;

providing a plurality of items in said container on said support surface;

sizing said open passageway to provide a first passageway dimension greater than the first item dimension, and to provide a second passageway dimension greater than the second item dimension and less than the third item dimension;

delivering an pulse of pressurized fluid through said open passageway into said container against the items sufficient to lift the items from said support surface and to agitate the items;

allowing the items to fall downwardly towards said elongated open passageway upon termination of said pulse of pressurized fluid;

directing at least one of the plurality of items through said open passageway upon termination of said pulse of pressurized fluid, such that said at least one item passes through said open passageway with the first item dimension of the item being aligned with said first passageway dimension and said second item dimension being aligned with the second passageway dimension.

\* \* \* \* \*